W. B. HOPKINS.
Churn.
No. 31,806.
Patented March 26, 1861.
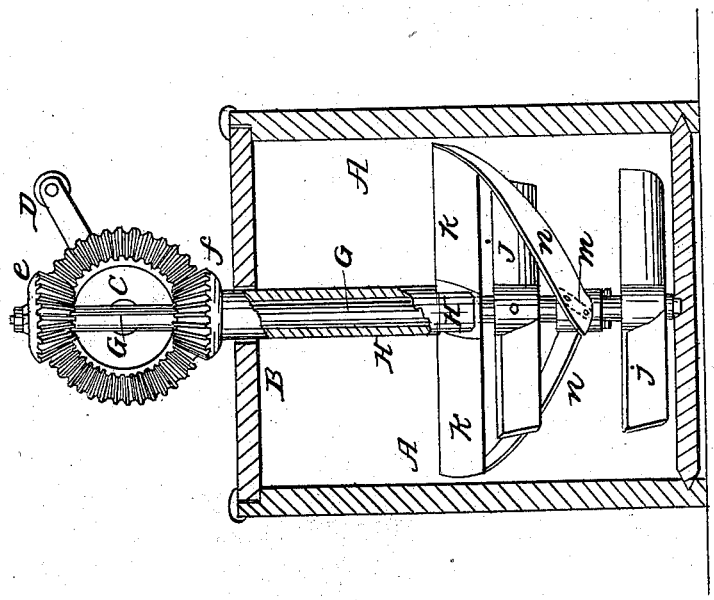
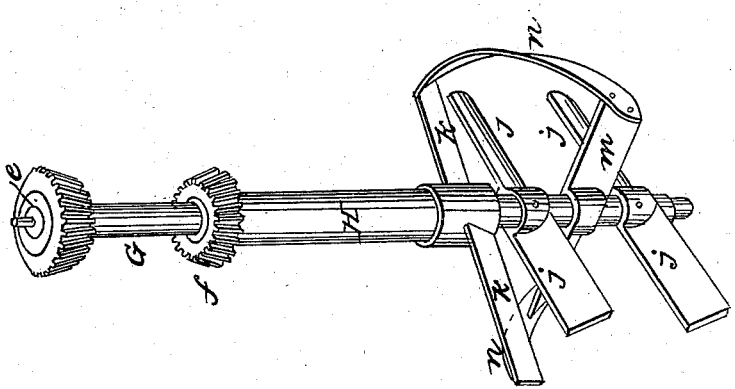
Witnesses
Inventor
Wm. Bentty Hopkins

UNITED STATES PATENT OFFICE.

WM. BENTLY HOPKINS, OF OAKFIELD, NEW YORK.

CHURN.

Specification of Letters Patent No. 31,806, dated March 26, 1861.

*To all whom it may concern:*

Be it known that I, WILLIAM BENTLY HOPKINS, of Oakfield, in the county of Genesee and State of New York, have invented a new and Improved Churn; and I do hereby declare that the following is a full and exact description thereof, reference being had to the accompanying drawings, making part of this specification, in which—

Figure 1 is a vertical section of the body of the churn, with a portion of one of the beater shafts also in section. Fig. 2 is a perspective view of the beaters, their shafts and pinions combined.

Like letters designate corresponding parts in both of the figures.

As represented in the drawing, A is the body of the churn, which may consist of any cylindrical vessel of suitable size and form, with a cover B, adapted thereto, which is most conveniently formed by dividing it across its diameter into two equal parts. To one of these the frame, or standard, which supports the driving wheel C, is attached. The wheel is provided with a crank, D, by which it is turned, and consists of a bevel gear, meshing with the two beveled pinions $e$ $f$, placed above and below it. The pinion $e$ is attached to the spindle G, which passes to the bottom of the churn, where a box or step is provided in which it turns. To this spindle are attached two slats or beaters $j$ $j$, one being as close to the bottom as is expedient and the other far enough above it to leave an interval of space more than is equal to its width. The pinion $f$ is attached to a hollow shaft, H, through which spindle G, passes, the former being large enough to allow it to rotate without friction, except at the top, where it fits close for a short distance, to form a box or bearing on the spindle. It extends downward to within a short distance of the upper beater $j$, where it terminates with a slat or beater $k$, similar to those attached to the spindle G, but somewhat longer. Another beater slat $m$, corresponding in length with this, is placed upon the spindle G, intermediate between those first described ($j$ $j$), but it is loose upon the spindle and turns with the shaft H. It is connected with slat $k$ by two hoops or bands, $n$ $n$, fixed to either end thereof, which are curved so as to be concentric with the vessel A, and run spirally one fourth of the circumference of their circle, where they are attached to the ends of $m$ which is consequently in a position at right angles with slat $k$. Slat $m$ therefore revolves in the same direction of $k$ and forty five degrees (45°) in advance of it, while $j$ $j$ revolve in the opposite direction. $k$ $m$ and $j$ $j$ are beveled, or inclined in opposite directions, so as to break and agitate the cream more violently.

The hoops $n$ $n$ may be made of metal or thin pieces of wood, and they not only maintain the relative position between $k$ and $m$, but have a specific effect in displacing and agitating that portion of the milk or cream which would, by the operation of the two sets of beaters, be forced and impacted against the walls of the vessel, where they would, if allowed to remain, escape the action of the beaters, to a considerable extent. They encircle the upper slat $j$, and by keeping the cream in motion at the periphery of its inclosure, enable it to be drawn back into the path of this beater, as it moves in an opposite direction.

The arrangement is productive of most efficient and rapid action, producing more butter in less time than by churns of ordinary construction. It also allows of a very compact form of the implement and it is easily worked from the simplicity of its mechanism. The removal of the cover also removes the driving wheel and crank, and allows the beaters to be taken out by themselves.

The spindle G, may pass through the beater slats $j$ $j$, or a hub may be made on the spindle large enough to receive them in mortises.

Wood or metal may be used in the construction, as is deemed preferable.

I am aware that churns have been constructed having beaters upon separate shafts rotating in opposite directions, but this simply I do not claim.

What I claim as my invention and desire to secure by Letters Patent is—

The beaters $j$ $j$ and $k$, $m$, the latter provided with spiral arms, $n$ $n$, constructed and operating substantially in the manner and for the purposes shown and described.

WM. BENTLY HOPKINS.

Witnesses:
J. FRASER,
S. J. ALLIS.